United States Patent
Roberts

(10) Patent No.: US 10,689,228 B2
(45) Date of Patent: Jun. 23, 2020

(54) ELEVATOR SYSTEM EVALUATION DEVICE

(71) Applicant: Otis Elevator Company, Farmington, CT (US)

(72) Inventor: Randall Roberts, Hebron, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 331 days.

(21) Appl. No.: 15/547,693

(22) PCT Filed: Feb. 3, 2016

(86) PCT No.: PCT/US2016/016317
§ 371 (c)(1),
(2) Date: Jul. 31, 2017

(87) PCT Pub. No.: WO2016/126788
PCT Pub. Date: Aug. 11, 2016

(65) Prior Publication Data
US 2018/0009632 A1    Jan. 11, 2018

Related U.S. Application Data

(60) Provisional application No. 62/111,760, filed on Feb. 4, 2015.

(51) Int. Cl.
| | |
|---|---|
| *B66B 5/00* | (2006.01) |
| *B66B 11/04* | (2006.01) |
| *B66B 9/00* | (2006.01) |
| *G01B 7/14* | (2006.01) |

(52) U.S. Cl.
CPC .......... *B66B 5/0025* (2013.01); *B66B 5/0037* (2013.01); *B66B 11/0407* (2013.01); *B66B 9/003* (2013.01); *G01B 7/14* (2013.01)

(58) Field of Classification Search
CPC .. B66B 5/0025; B66B 5/0037; B66B 11/0407
USPC .......................................... 187/391
See application file for complete search history.

(56) References Cited

U.S. PATENT DOCUMENTS

| | | | | |
|---|---|---|---|---|
| 4,627,170 A | * | 12/1986 | McKechnie | .......... B66B 7/1246 33/533 |
| 5,203,432 A | * | 4/1993 | Grinaski | ............. B66B 11/0055 187/251 |
| 5,751,076 A | * | 5/1998 | Zhou | ................... B66B 11/0407 187/250 |

(Continued)

FOREIGN PATENT DOCUMENTS

| | | |
|---|---|---|
| CN | 1462718 A | 12/2003 |
| CN | 1535371 A | 10/2004 |

(Continued)

OTHER PUBLICATIONS

Chinese First Office Action for application CN 201680008986.4, dated Sep. 30, 2018, U320317CN, 9 pages.

(Continued)

*Primary Examiner* — David S Warren
(74) *Attorney, Agent, or Firm* — Cantor Colburn LLP

(57) ABSTRACT

An evaluation device for an elevator system includes a self-propelled drive unit including a motor secondary to travel along a motor primary in a hoistway, and at least one diagnostic sensor.

10 Claims, 4 Drawing Sheets

(56) References Cited

U.S. PATENT DOCUMENTS

| | | | |
|---|---|---|---|
| 6,401,872 B1* | 6/2002 | Morishita | B66B 7/042 |
| | | | 187/292 |
| 8,813,574 B2* | 8/2014 | Fischer | B66B 7/1215 |
| | | | 73/826 |
| 9,457,988 B1* | 10/2016 | Anderson | B66B 5/16 |
| 9,561,938 B2* | 2/2017 | Kilpelainen | B66B 19/00 |
| 9,714,156 B2* | 7/2017 | Valkama | B66B 5/0087 |
| 9,751,728 B2* | 9/2017 | Mertala | E04G 3/246 |
| 9,828,212 B2* | 11/2017 | Vaarala | B66B 5/00 |
| 9,957,136 B2* | 5/2018 | Hawkins | B66B 7/1246 |
| 2005/0217263 A1 | 10/2005 | Cortona et al. | |
| 2011/0278097 A1* | 11/2011 | Altenburger | B66B 7/027 |
| | | | 187/255 |
| 2012/0222490 A1* | 9/2012 | Fischer | B66B 7/1215 |
| | | | 73/828 |
| 2013/0270041 A1* | 10/2013 | Loeser | B66B 11/0407 |
| | | | 187/250 |
| 2015/0217972 A1* | 8/2015 | Hawkins | G01C 15/10 |
| | | | 187/391 |
| 2015/0251877 A1* | 9/2015 | Niikawa | B66B 5/04 |
| | | | 187/305 |
| 2017/0036886 A1* | 2/2017 | Penn | B66B 1/3461 |
| 2018/0009632 A1* | 1/2018 | Roberts | B66B 11/0407 |
| 2018/0248498 A1* | 8/2018 | Piitulainen | H02P 25/064 |
| 2019/0106296 A1* | 4/2019 | Barneman | B66B 19/002 |

FOREIGN PATENT DOCUMENTS

| | | |
|---|---|---|
| CN | 101875465 A | 11/2010 |
| CN | 102923547 A | 2/2013 |
| GB | 2281664 A | 3/1995 |
| GB | 2383473 A | 6/2003 |

OTHER PUBLICATIONS

Chinese Second Office Action for application 201680008986.4, dated Mar. 13, 2019, 44 pages.

International Search Report and Written Opinion for application PCT/US2016/016317, dated Jun. 20, 2016, 9pgs.

Chinese Third Office Action for application CN 201680008986.4, dated Feb. 6, 2020, U320317CN, 29 pages.

* cited by examiner

ELEVATOR SYSTEM EVALUATION DEVICE

FIELD OF THE INVENTION

The subject matter disclosed herein relates generally to the field of elevators, and more particularly to a multicar, ropeless elevator system.

DESCRIPTION OF RELATED ART

Ropeless elevator systems, also referred to as self-propelled elevator systems, are useful in certain applications (e.g., high rise buildings) where the mass of the ropes for a roped system or a roped system's required core space is prohibitive and there is a desire for multiple elevator cars to travel in a single lane. There exist ropeless elevator systems in which a first lane is designated for upward traveling elevator cars and a second lane is designated for downward traveling elevator cars. A transfer station at each end of the hoistway is used to move cars horizontally between the first lane and second lane.

Ropeless elevator systems require routine maintenance and low tolerances for optimal performance. Elevator hoistway components, including linear motor primaries and guide rails must remain within certain parameters. Further, typical elevator system inspections maybe time consuming, costly, and cause system downtime. A device and method that can evaluate components of a ropeless elevator system is desired.

BRIEF SUMMARY

According to an embodiment of the invention, an evaluation device includes a self-propelled drive unit including a motor secondary to travel along a motor primary in a hoistway, and at least one diagnostic sensor.

In addition to one or more of the features described above, or as an alternative, further embodiments could include that the evaluation device is used during installation of an elevator system.

In addition to one or more of the features described above, or as an alternative, further embodiments could include that the evaluation device is used during maintenance of an elevator system.

In addition to one or more of the features described above, or as an alternative, further embodiments could include that the at least one diagnostic sensor evaluates an alignment of the motor primary.

In addition to one or more of the features described above, or as an alternative, further embodiments could include that the at least one diagnostic sensor evaluates an alignment of an elevator guide rail.

In addition to one or more of the features described above, or as an alternative, further embodiments could include that the at least one diagnostic sensor evaluates a spacing of a motor gap.

In addition to one or more of the features described above, or as an alternative, further embodiments could include that the at least one diagnostic sensor is a contact sensor.

In addition to one or more of the features described above, or as an alternative, further embodiments could include that the at least one diagnostic sensor is a non-contact sensor.

In addition to one or more of the features described above, or as an alternative, further alternatives could include a data processing unit associated with the at least one diagnostic sensor.

According to an embodiment of the invention, a method to evaluate an elevator system includes providing an evaluation device to a hoistway, wherein the hoistway includes a motor primary, travelling along the motor primary via a self-propelled drive unit of the evaluation device, wherein the self-propelled drive unit includes a motor secondary, and sensing a plurality of parameters via at least one diagnostic sensor.

In addition to one or more of the features described above, or as an alternative, further embodiments could include evaluating the elevator system during installation of the elevator system via the at least one diagnostic sensor.

In addition to one or more of the features described above, or as an alternative, further embodiments could include evaluating the elevator system during operation of the elevator system via the at least one diagnostic sensor.

In addition to one or more of the features described above, or as an alternative, further embodiments could include evaluating an alignment of the motor primary via the at least one diagnostic sensor.

In addition to one or more of the features described above, or as an alternative, further embodiments could include evaluating an alignment of the an elevator guide rail via the at least one diagnostic sensor.

In addition to one or more of the features described above, or as an alternative, further embodiments could include evaluating a gap spacing of the motor primary via the at least one diagnostic sensor.

Technical function of the embodiments described above includes an evaluation device including a self-propelled drive unit including a motor secondary.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION OF THE INVENTION

Figure 1:
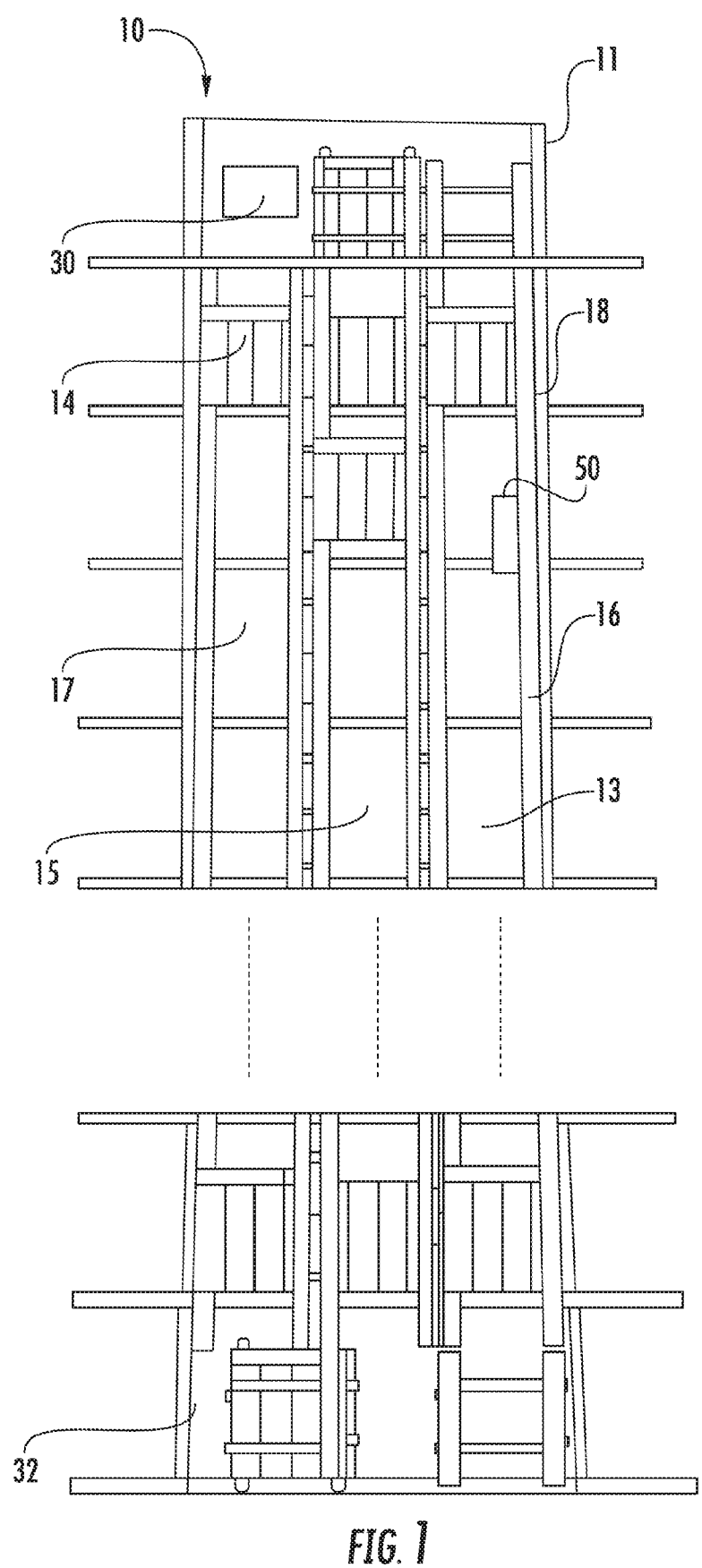
FIG. 1 depicts a multicar elevator system in an exemplary embodiment.

FIG. 1 depicts a multicar, ropeless elevator system 10 in an exemplary embodiment. Elevator system 10 includes a hoistway 11 having a plurality of lanes 13, 15 and 17. While three lanes are shown in FIG. 1, it is understood that embodiments may be used with multicar, ropeless elevator systems have any number of lanes. In each lane 13, 15, 17, cars 14 travel in one direction, i.e., up or down. For example, in FIG. 1 cars 14 in lanes 13 and 15 travel up and cars 14 in lane 17 travel down. One or more cars 14 may travel in a single lane 13, 15, and 17.

Above the top floor is an upper transfer station 30 to impart horizontal motion to elevator cars 14 to move elevator cars 14 between lanes 13, 15 and 17. It is understood that upper transfer station 30 may be located at the top floor, rather than above the top floor. Below the first floor is a lower transfer station 32 to impart horizontal motion to elevator cars 14 to move elevator cars 14 between lanes 13, 15 and 17. It is understood that lower transfer station 32 may be located at the first floor, rather than below the first floor. Although not shown in FIG. 1, one or more intermediate transfer stations may be used between the first floor and the top floor. Intermediate transfer stations are similar to the upper transfer station 30 and lower transfer station 32.

Cars 14 are propelled using a motor system having a primary, fixed portion 16 and a secondary, moving portion 18. The primary portion 16 includes windings or coils mounted at one or both sides of the lanes 13, 15 and 17. Secondary portion 18 includes permanent magnets mounted to one or both sides of cars 14. Primary portion 16 is supplied with drive signals to control movement of cars 14 in their respective lanes.

In an exemplary embodiment, an evaluation device 50 is utilized with elevator system 10 to evaluate components of elevator system 10.

Figure 2:
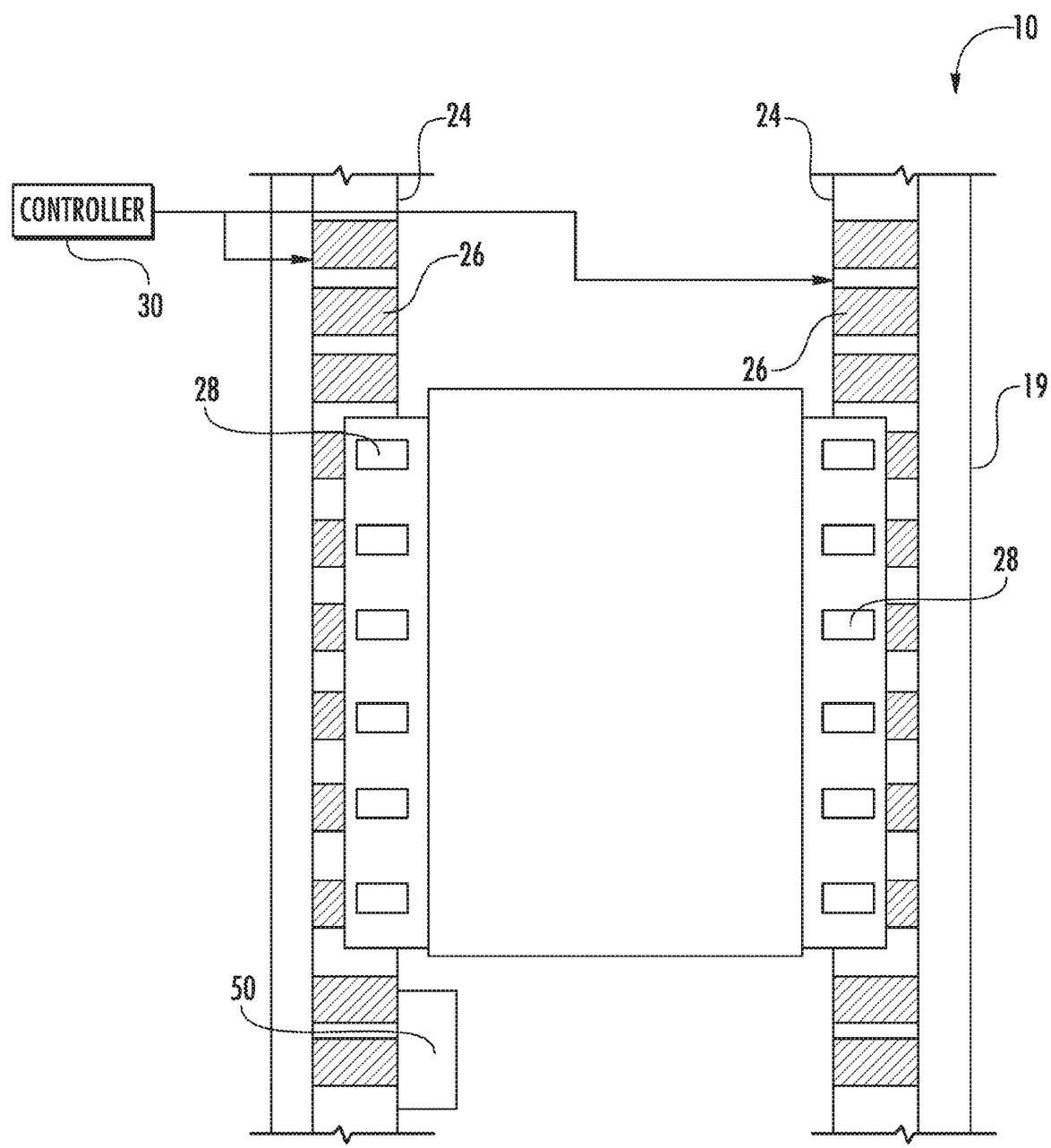
FIG. 2 shows a linear motor for use in a multicar elevator system, such as the system depicted in FIG. 1.

FIG. 2 depicts an elevator system 10 having a self-propelled elevator car 14 in an exemplary embodiment. Elevator system 10 includes an elevator car 14 that travels in a hoistway 11. Elevator car 14 is guided by one or more guide rails 24 extending along the length of hoistway 11, the guide rails may be affixed to the structural member 19. Elevator system 10 employs a motor having a stator 26 including a plurality of phase windings. Stator 26 may be mounted to guide rail 24, incorporated into the guide rail 24, or may be located apart from guide rail 24. Stator 26 serves as one portion of a permanent magnet synchronous motor to impart motion to elevator car 14. Permanent magnets 28 are mounted to car 14 to provide a second portion of the permanent magnet synchronous motor. Windings of stator 26 may be arranged in three phases, as is known in the electric motor art. Two stators 26 may be positioned in the hoistway 11, to coact with permanent magnets 28 mounted to elevator car 14. The permanent magnets 28 may be positioned on two sides of elevator car 14, as shown in FIG. 2. Alternate embodiments may use a single stator 26—permanent magnet 28 configuration, or multiple stator 26—permanent magnet 28 configurations. In certain embodiments, stator 26 is also referred to as a motor primary 26. Similarly, permanent magnets 28 may also be referred to as a motor secondary 28. Motor primary 26 is positioned to provide a certain air gap between the stator 26 and the permanent magnets 28. The spacing of the air gap is critical in providing ride quality and system performance. A controller 30 provides drive signals to the stator(s) 26 to control motion of the elevator car 14. Controller 30 may be implemented using a general-purpose microprocessor executing a computer program stored on a storage medium to perform the operations described herein. Alternatively, controller 30 may be implemented in hardware (e.g., ASIC, FPGA) or in a combination of hardware/software. Controller 30 may also be part of an elevator control system. Controller 30 may include power circuitry (e.g., an inverter or drive) to power the stator(s) 26. Although a single controller 30 is depicted, it will be understood by those of ordinary skill in the art that a plurality of controllers 30 may be used. For example, a single controller 30 may be provided to control the operation of a group of stators 26 over a relatively short distance.

Figure 2A:
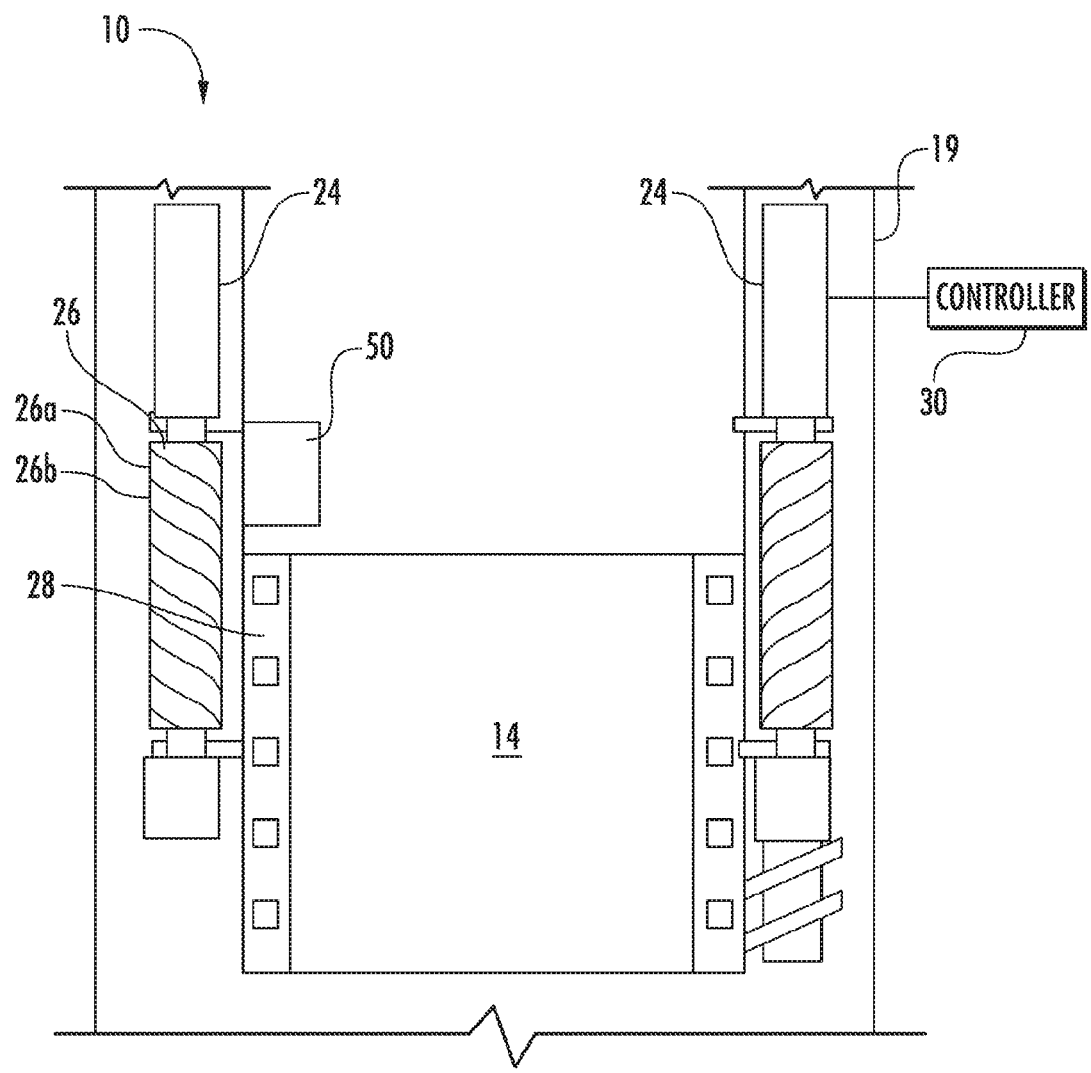
FIG. 2A shows a rotary magnetic motor for use in a multicar elevator system, such as the system depicted in FIG. 1.

FIG. 2A depicts an alternative propulsion system, including elevator car 14 and magnetic screw assemblies 26 in an exemplary embodiment. Magnetic screw assembly (primaries) 26 includes a magnetic screw having a magnetic element in the form of first permanent magnet 26a of a first polarity positioned along a non-linear (e.g., helical) path along a longitudinal axis of the magnetic screw assembly 26. A second magnetic element in the form of a second permanent magnet 26b of a second polarity (opposite the first polarity) is positioned along a non-linear (e.g., helical) path along a longitudinal axis of the magnetic screw assembly 26. The paths of the first permanent magnet 26a and second permanent magnet 26b do not intersect.

Permanent magnets (secondaries) 28 are positioned at a first end of the magnetic screw assembly 26 and rotate the magnetic screw assembly 26 about its longitudinal axis in response to control signals from controller 30 to provide propulsion for car 14 and evaluation device 50.

Figure 3:
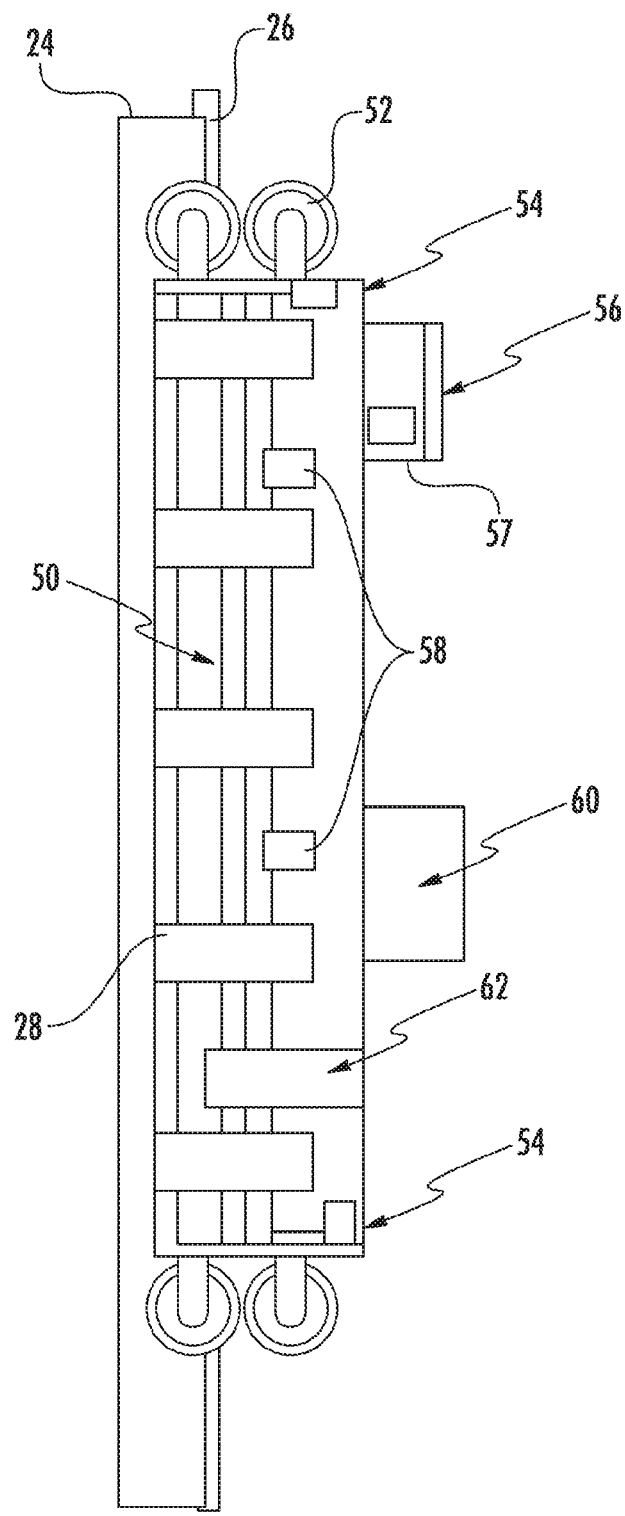
FIG. 3 shows an evaluation device for use in a multicar elevator system, such as the system depicted in FIG. 1.

Referring to FIG. 3 an exemplary embodiment of evaluation device 50 for use with elevator system 10 is shown. In an exemplary embodiment, evaluation device 50 is self-propelled to move along hoistways by propelling along motor primaries 26 found in the hoistways shown in FIGS. 1, 2, and 2A. In an exemplary embodiment, evaluation device 50 has a plurality of permanent magnets 28 that allow evaluation device 50 to travel though hoistways in a similar manner as cars 14. In certain embodiments, the permanent magnets 28 are linear motor secondaries, while in other embodiments, the permanent magnets 28 allow for rotary magnetic propulsion. In certain embodiments, feedback from permanent magnets 28 can evaluate and confirm the health of motor primaries 26 by monitoring electrical signals. Motion control unit 60 may be utilized to control the direction and speed of evaluation device 50. In other embodiments, evaluation device 50 is not self-propelled and is instead attached to a conventional car 14 to allow car 14 to provide propulsion through the hoistway. In other embodiments, evaluation device 50 is self-propelled by alternative propulsion methods, including, but not limited to a rotary magnetic screw actuator.

In certain embodiments, brakes 62 are utilized to slow evaluation device 50 as it travels through a hoistway. In certain embodiments, brakes 62 can further anchor evaluation device 50 at a certain location to allow diagnostics to be taken. Brakes 62 may act against guide rail 24 to slow evaluation device 50.

In an exemplary embodiment, wheels 52 are utilized to stabilize and couple evaluation device 50 to a guide rail 24 of the hoistway. In certain embodiments, wheels 52 are also contact type sensors that can measure alignment of guide rails 24 and primaries 26. Measurements from wheels 52 can be utilized and compiled to form a guide rail 24 profile to evaluate and monitor guide rail 24 condition.

In an exemplary embodiment, evaluation unit 50 includes accelerometers 54. Accelerometers 54 may be utilized to evaluate performance characteristics of elevator system 10, including thrust provided by primaries 26. Accelerometers may further measure and evaluate guide rail and primary alignment, ride quality, linear motor quality, and create guide rail profiles. In certain embodiments, accelerometers measure qualities of a rotary propulsion system, such as the rotary profile of permanent magnet 26a and 26b (as shown in FIG. 2A).

In an exemplary embodiment, evaluation unit 50 includes non-contact sensors 58. Non-contact sensors 58 may be utilized to analyze gaps between motor elements, such as stators or motor primaries and magnets or motor secondaries. Advantageously, by monitoring the alignment of the motor primaries 26 with respect to guide rails 24, the motor gap can be determined, and elevator system performance can be maintained and preventative maintenance can be performed in a timely manner. In certain embodiments, non-contact sensors 58 can be utilized to analyze the rotary profile of permanent magnet 26a and 26b (as shown in FIG. 2A).

In an exemplary embodiment, data from sensors 52, 54, and 58 are processed and collected by data processing unit 56. In an exemplary embodiment, data processing unit 56 can work in conjunction with signal analyzer 57 to perform on board data processing algorithms. In certain embodiments, data processing and data algorithms can be executed at an alternate location such as controller 30 or any suitable location. In certain embodiments, raw data, analyzed data, and determinations can be communicated to a user or technician via a user interface.

Information from sensors 52, 54, and 58 can be used to survey the general condition of guide rails and linear motor primaries without extensive operations that require costly or time consuming service interruptions. Information from sensors 52, 54, and 58 can be used to create maps and profiles relating features, defects, and performance characteristics corresponding to elevator system components at various locations. For example, sensors 52, 54, and 58 can be utilized to determine a guide rail 24 profile and alignment record. In another example, sensors 52, 54, and 58 can be utilized to determine the profile and/or alignment of the motor primaries 26 with respect to guide rails 24 and a distance between the motor primaries 26 and the guide rails 24. In another embodiment, sensors 52, 54, and 58 are used to survey the alignment and properties of other propulsion mechanisms, including, but not limited to a rotary magnetic screw. In certain embodiments, digital signal processing can be used to reconstruct a rotary magnetic screw profile, such as the rotary magnetic screw 26 assembly shown in FIG. 2A. In certain embodiments, a rotary magnetic screw profile can show imperfections for later maintenance and repair.

In an exemplary embodiment, such records can be created by measuring sensors 52, 54, 58 to record a location of a guide rail 24 and/or motor primaries 26 with respect to the vertical location of evaluation device 50. In certain embodiments, non contact sensors 58 and accelerometers 54 can be utilized to detect motion/position of a guide rail 24 or a motor primary 26 relative to evaluation device 50. Further, in certain embodiments, accelerometers 54 can be utilized to detect lateral motion of a guide rail 24 or motor primary 26 during an evaluation run. In certain embodiments, data processing unit 56 and signal analyzer 57 can be utilized to estimate a relative lateral position of guide rail 24 and/or motor primaries 26 with respect to evaluation device 50. In certain embodiments, the vertical position of evaluation device 50 is mapped against lateral positions of guide rail 24 and/or motor primaries 26 to yield a profile and/or alignment record as described above. In certain embodiments, calculations and processing for such mappings is performed by data processing unit 56 and/or signal analyzer 57. In certain embodiments, data processing unit 56 and/or signal analyzer 57 can be utilized for data filtering and data processing, while in other embodiments, such calculations are performed on another outboard device, such as controller 30. In an exemplary embodiment, a user interface is utilized to display a resulting guide rail 24 and/or motor primary 26 map to allow installation and maintenance personnel to fix any issues such as misalignments.

The alignment between the motor primaries 26 and guide rails 24 controls the air gap between the motor primaries 26 and the permanent magnets (motor secondaries) 28. Variances from a standard specification can be recorded and mapped. In certain embodiments, variances in guide rail 24 greater than 1-2 mm may require service to maintain ride quality.

In certain embodiments, the motor primaries 26 are segmented, and the distance between the primary 26 and permanent magnets (secondary) 28 can vary from segment to segment. Evaluation device 50 can record and map positions of linear motor primaries for later review. In an exemplary embodiment, survey of the system can be performed during installation operations. In other operations, survey of the system can be performed during operation for maintenance purposes. Results from surveys of the guide rails 24 and motor primaries 26 can be used to enhance ride quality and elevator system performance. In certain embodiments, maps and profiles can be reviewed at a later time to identify elevator system components that need maintenance and repairs. In certain embodiments, maps and profiles can be reviewed to recertify guide rails and motor primaries 26 after significant events, such as earthquakes, elevator safety actuations, etc.

In certain embodiments, such as when used with dual guide rail elevator systems, the evaluation device 50 can survey or evaluate one side and then be moved to the other guide rail 24. In other embodiments, the evaluation device 50 is configured to evaluate multiple guide rails and motor primaries 26 without externally manipulating evaluation device 50. Advantageously, evaluation device 50 can be used while cars 14 are within hoistway 11, either during activity, or periods of low system utilization.

In certain embodiments, evaluation device 50 can include a video device to visually inspect guide rail 24 and motor primaries 26 for visual gross damage or defects. In certain embodiments, evaluation device 50 can further include a cleaning device to remove debris and dust from guide rail 24 and motor primaries 26. The cleaning device can include, but is not limited to, a blower or a cleaning head.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An evaluation device for use in an elevator system including a hoistway; a guide rail configured to guide an elevator car in the hoistway; a stator mounted on the guide rail, the stator including a plurality of coils; a plurality of permanent magnets mounted on the elevator car; an evaluation device separate from the elevator car, the evaluation device comprising:
   a self-propelled drive unit including a motor secondary configured to travel along the stator; and
   at least one diagnostic sensor.

2. The evaluation device of claim 1, wherein the evaluation device is used during installation of an elevator system.

3. The evaluation device of claim 1, wherein the evaluation device is used during maintenance of an elevator system.

4. The evaluation device of claim 1, wherein the at least one diagnostic sensor evaluates an alignment of the motor primary.

5. The evaluation device of claim 1, wherein the at least one diagnostic sensor evaluates an alignment of an elevator system guide rail.

6. The evaluation device of claim 1, wherein the at least one diagnostic sensor evaluates a spacing of a motor gap.

7. The evaluation device of claim 1, wherein the at least one diagnostic sensor is a contact sensor.

8. The evaluation device of claim 1, wherein the at least one diagnostic sensor is a non-contact sensor.

9. The evaluation device of claim 1, wherein the evaluation device further comprises a data processing unit associated with the at least one diagnostic sensor.

10. An elevator system comprising:
a hoistway;
a guide rail configured to guide an elevator car in the hoistway;
a stator mounted on the guide rail, the stator including a plurality of coils;
a plurality of permanent magnets mounted on the elevator car;
an evaluation device separate from the elevator car, the evaluation device including:
a self-propelled drive unit including a motor secondary configured to travel along the stator; and
at least one diagnostic sensor.

* * * * *